United States Patent [19]

Constantikes et al.

[11] 3,925,193

[45] Dec. 9, 1975

[54] REMOVAL OF FLUORIDES FROM CATALYTIC REACTOR FEED

[75] Inventors: George J. Constantikes; Joe Van Pool, both of Bartlesville, Okla.

[73] Assignee: Phillips Petroleum Company, Bartlesville, Okla.

[22] Filed: Oct. 10, 1974

[21] Appl. No.: 513,825

[52] U.S. Cl. .................. 208/91; 208/262; 208/297
[51] Int. Cl.² ........................................ C10G 25/00
[58] Field of Search ............ 208/262, 297, 299, 88, 208/91

[56] References Cited
UNITED STATES PATENTS

| | | | |
|---|---|---|---|
| 2,347,945 | 5/1944 | Frey | 208/262 |
| 2,456,348 | 12/1948 | Waddill | 260/683.4 |
| 2,917,452 | 12/1959 | Brooke et al. | 208/91 |
| 2,967,819 | 1/1961 | Leum et al. | 208/88 |
| 3,574,091 | 4/1971 | Hayes | 208/138 |
| 3,864,243 | 2/1975 | Reusser et al. | 208/262 |

*Primary Examiner*—Delbert E. Gantz
*Assistant Examiner*—Juanita M. Nelson

[57] ABSTRACT

In catalytic processes employing fluoride sensitive catalyst, a method for removing traces of fluorides from a hydrocarbon feedstock is provided in which the hydrocarbon feedstock is contacted with an adsorbent consisting essentially of alumina at a temperature within the range of about 340° to about 480°F. In a preferred embodiment naptha or gasoline feedstock is treated before being fed to a hydrodesulfurization reaction and subsequent reforming reaction.

10 Claims, No Drawings

3,925,193

REMOVAL OF FLUORIDES FROM CATALYTIC REACTOR FEED

BACKGROUND OF THE INVENTION

This invention is related to removing fluorides from hydrocarbons. In one of its aspects, this invention is related to removing traces of fluorides from hydrocarbon feedstock for processes catalyzed by fluoride sensitive catalyst. In another of its aspects, this invention is related to contacting hydrocarbons with alumina.

It has long been recognized that the reaction of hydrocarbons in the presence of certain catalysts, parex. catalytic reforming of hydrocarbons in the presence of a platinum base catalyst, the presence of fluorides is detrimental because the fluorides shorten the active life of the catalyst. For this reason, special measures are taken to remove fluorides from a hydrocarbon feedstock that has been produced or treated with catalyst containing fluorides when a subsequent treatment of the feedstock will entail the use of fluoride sensitive catalyst. In general, it has been recognized that the introduction of relatively large quantities of fluorides in the range of 0.1 percent or more fluoride in the hydrocarbon mixture is troublesome with certain catalysts. It has now discovered that relatively minute amounts of fluoride which occur naturally in certain hydrocarbon feedstocks in the range of 20 parts per million or less fluorides in the total hydrocarbon mixture are detrimental to the active life of fluoride sensitive catalyst.

In a search for an adsorption process suitable for the removal of quantities of 20 parts per million or less fluorides from hydrocarbon mixtures, it has been observed in laboratory tests as pointed out in U.S. Pat. No. 2,456,348, that the pressure of silica in the adsorbents is undesirable because it causes the formation of silicon tetrafluoride. The silicon tetrafluoride is volatile and acts in catalytic processes to poison the catalyst. The use of a silica-containing adsorbent does not solve the problem of keeping fluorides out of a catalytic reactor, particularly in the small amounts of fluoride now known to be sufficient to act as catalyst poisons.

We have discovered that adsorption on a non-siliceous alumina adsorbent prior to contact with a fluoride sensitive catalyst at a temperature in the range of about 340° to 480°F will remove traces of fluorides in the range of up to about 20 parts per million of the total hydrocarbon feedstock thereby preventing a decrease in the active life of the catalyst. Other advantages of the present invention will become apparent to those skilled in the art from the accompanying disclosure and the appended claims.

STATEMENT OF THE INVENTION

According to this invention, in a catalytic process for treating hydrocarbon feedstock in which the process uses a catalyst sensitive to fluorides, a feedstock containing a maximum of about 20 parts per million fluorides is contacted with an adsorbent consisting essentially of alumina at a temperature in the range of about 340° to about 480°F thereby reducing the fluoride content of the feedstock to less than one part per million of the total hydrocarbon mixture.

In a preferred embodiment of the invention, the hydrodesulfurized feedstock for a catalytic reforming process such as that described in detail in U.S. Pat. No. 3,574,091 is treated by adsorption on a non-siliceous, alumina adsorbent to remove traces of fluoride from the feedstock. It is necessary to treat a hydrodesulfurized hydrocarbon, because the hydrodesulfurization process does not remove all of the traces of fluorides from a hydrocarbon mixture subjected to that treatment. Use of the alumina adsorbent by the process of the present invention is effective with any fluoride sensitive reforming catalysts, but is particularly useful with reforming catalyst that contain platinum, either as a metal or in combined form.

In another embodiment of the invention, the hydrocarbon feedstock to a hydrodesulfurization process in which the catalyst is sensitive to fluorides is treated by adsorption on an alumina adsorbent by the process of this invention. this process is particularly advantageous in removing traces of fluorides from feedstocks that will be brought into contact with catalyst containing molybdenum, cobalt, or combinations thereof such as cobalt molybdate.

A most effective combination process for the reforming of hydrocarbon feedstock is accomplished by removing traces of fluorides from the hydrocarbons and then hydrodesulfurizing the feedstock before passing the hydrodesulfurized feedstock in contact with the reforming catalyst. Such a process has the advantage of treating the feedstock for removal of traces of fluorides at a temperature in the range of 340° to about 480°F as the feedstock is being warmed for a hydrodesulfurization treatment which is usually carried out at a temperature range above 650°F in the presence of hydrogen and at an elevated pressure. In a typical hydrodesulfurization of hydrocarbon streams such as illustrated in U.S. Pat. Nos. 3,487,011 and 2,951,807, a gasoline stream is contacted with a cobalt molybdate catalyst (3 percent cobalt oxide and 15 percent molybdenum oxide) deposited on a activated alumina in the presence of hydrogen at a temperature of about 680°F, a pressure of about 600 psig, a space velocity of about 4 volumes of gasoline per volume of catalyst per hour and a hydrogen rate of about 4,000 standard cubic feet per barrel of gasoline feedstock. Such a treatment reduces the sulfur content from about 1 percent to less than 1 part per million by weight.

The hydrodesulfurized feedstock is then passed into contact with a reforming catalyst at reforming conditions which can include a pressure of about 50 to about 350 psig at a temperature in the range of about 800° to about 1100°F, a liquid hourly space velocity of about 0.5 to about 15 volumes of gasoline per volume of catalyst per hour and a hydrogen to hydrocarbon mole ratio of about 0.5 to 1 to about 20 to 1.

It will be noted that carrying out the adsorption step prior to the hydrodesulfurization and the reforming process has the advantage of protecting both the hydrodesulfurization and the reforming catalyst by the removal of traces of fluorides and takes advantage of the increasing temperatures necessary for first the adsorption, second the hydrodesulfurization, and third the reforming process. A great deal of the advantage in conservation of energy would be lost by first hydrodesulfurizing and then cooling the effluent to the operating temperature of the adsorption with subsequent reheating to an even greater temperature for the reforming. In such a process, not only is the conservation of energy poor but the hydrodesulfurization catalyst is not protected from the activation by the presence of fluorides.

The process of this invention is effective with any mixed hydrocarbon feedstock, but particularly with naphtha and gasoline fraction feedstocks.

The temperature at which adsorption is carried out can range from about 340° to about 480°F, preferably from 375° to about 425°F. It is believed that at a temperature within this range that fluorides decompose with the liberation of fluorine. The alumina retains the flourine by adsorption.

EXAMPLE

In a specific example of our invention, a feedstock with the following composition

| Gravity, °API | 61.1 |
|---|---|
| ASTM, Distillation, °F | |
| IBP | 86 |
| 10% over | 139 |
| 30% over | 206 |
| 50% over | 259 |
| 70% over | 315 |
| 90% over | 388 |
| EP | 425 |
| Composition liq. vol. percent | |
| Naphthenes | 25 |
| Aromatics | 19 |
| Paraffins | 56 |
| Total Sulfur, 400 ppm by weight | |
| Total Nitrogen, <1 ppm by weight | |
| Total Fluorides, 3-10 ppm by weight | | is passed at the rate of 10,500 barrles per day through a bed of activated alumina for fluorides removal. The alumina is contained in a vessel 4 feet in diameter and 16 feet in height. The vessel contains 96 cubic feet of 4 to 8 mesh activated alumina (Alcoa) maintained at a temperature in the range of from 343° to 479°F, preferably 400°F by means of heating coils within the alumina and jackets on the vessel. Effluent from the alumina treater contains less than 1 ppm fluoride and is passed to the hydrodesulfurization unit operated as previously described. Effluent from the hydrodesulfurization unit contains less than 1 part per million sulfur and is passed to a reforming unit of the type described in the specification above and in U.S. Pat. No. 3,574,091.

We claim:

1. In a catalytic process for treating hydrocarbon feedstock said process using a catalyst sensitive to fluorides, a method for pretreating process feedstock containing a maximum of about 20 parts per million fluorides, said method comprising contacting said feedstock with an adsorbent consisting essentially of alumina at a temperature in the range of about 340° to 480°F thereby reducing the fluoride content of said feedstock to less than one part per million of the hydrocarbon mixture.

2. The method of claim 1 wherein the catalytic process is a hydrocarbon reforming process.

3. The method of claim 2 wherein the reforming process employs a catalyst comprising platinum.

4. The method of claim 1 wherein the catalytic process is a hydrocarbon hydrodesulfurization process.

5. The method of claim 4 wherein the hydrodesulfurization process employs a catalyst comprising cobalt or molybdenum.

6. The method of claim 1 wherein the contacting temperature is in the range of about 375° to about 425°F.

7. The method of claim 1 wherein the process using a fluoride sensitive catalyst is a combination process comprising separate reactions for hydrodesulfurizing a hydrocarbon feedstock and subsequently reforming the hydrodesulfurized feedstock.

8. A method of claim 1 wherein said feedstock is chosen from among naphtha and gasoline fractions.

9. A method for pretreating hydrocarbon feedstock to remove traces of fluoride contaminates before the feedstock is subjected in seriatim to hydrodesulfurization and reforming reactions catalyzed by fluoride sensitive catalyst said method comprising contact in the hydrocarbon feedstock with alumina at a temperature in the range of about 340° to about 480°F.

10. The method of claim 9 wherein the hydrocarbon feedstock is chosen from among naphtha and gasoline fractions containing a maximum of about 20 part per million fluorides.

* * * * *